J. SCHNEIDER & L. UILTING.
Machine for Shaping Tobacco-Pipe Bowls.
No. 162,698.
Patented April 27, 1875.
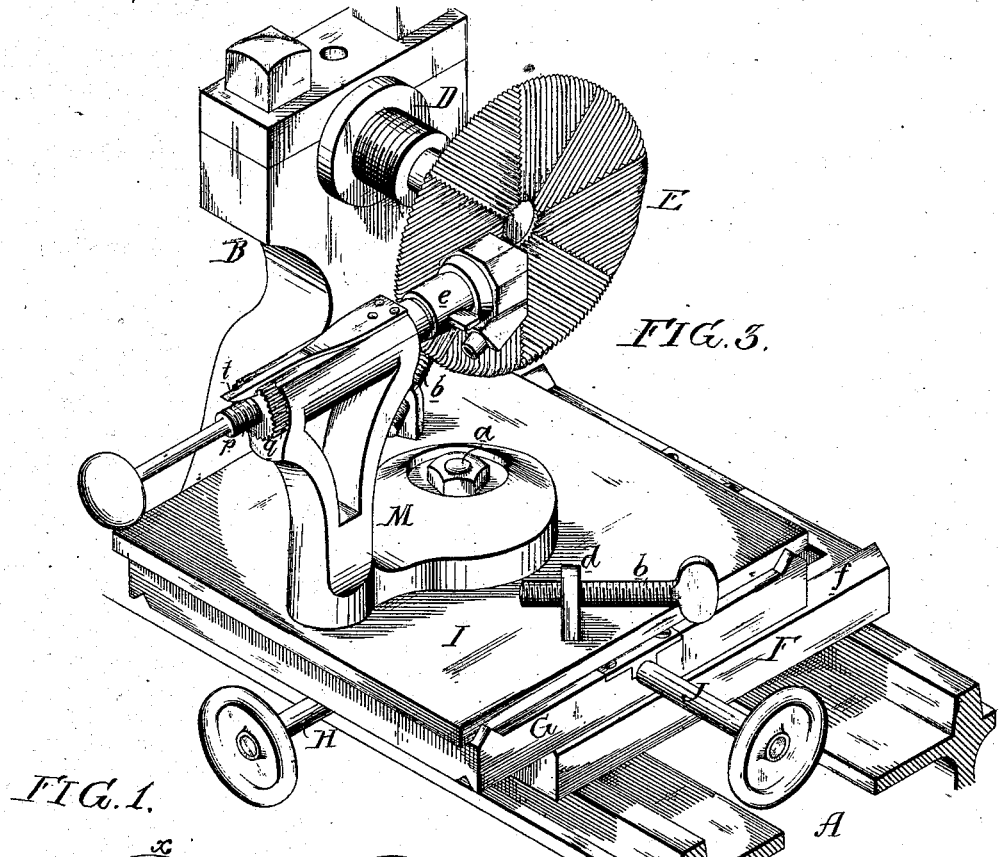
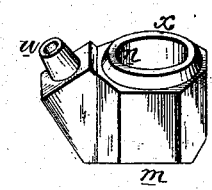
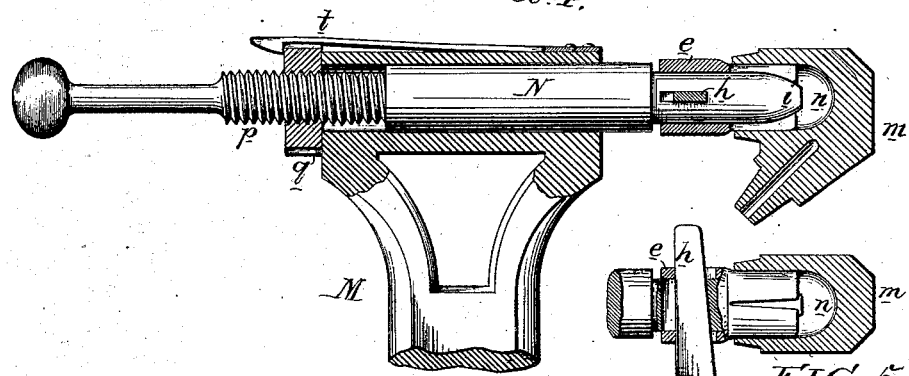

UNITED STATES PATENT OFFICE.

JOHN SCHNEIDER AND LEONARD UILTING, OF PHILADELPHIA, PENNSYLVANIA, ASSIGNORS TO VINCENT GROTTENTHALEN, OF SAME PLACE.

IMPROVEMENT IN MACHINES FOR SHAPING TOBACCO-PIPE BOWLS.

Specification forming part of Letters Patent No. 162,698, dated April 27, 1875; application filed July 31, 1874.

*To all whom it may concern:*

Be it known that we, JOHN SCHNEIDER and LEONARD UILTING, both of Philadelphia, Pennsylvania, have invented certain Mechanism for Shaping Tobacco-Pipe Bowls, of which the following is a specification:

The object of our invention is to reduce the bowls of tobacco-pipes from a crude condition to a finished state by the mechanism illustrated in the perspective view, Figure 3, and sectional view, Figs. 4 and 5, of the accompanying drawing.

The devices which form the subject of our invention may be used in connection with an ordinary wood-turning lathe, of which A in Fig. 3 represents a portion of the bed; B, part of the fixed head-stock; and D, the spindle, furnished with a rotary cutter, E, having cutting-edges on its face.

To the bed of the lathe is secured a plate, F, having guides $f$, adapted to grooves in the slide G, the position of the latter on the said plate F being determined by a screw-spindle, H; and to guides on the slide G is adapted another slide, I, the position of which is determined by the screw-spindle J.

The arrangement and operation of these slides are similar to those of an ordinary slide-rest.

In a central position on the slide I is a set-screw, $a$; and a nut and washer adapted to this set-screw so confine a carrier, M, to the said slide that it can be vibrated to and fro on the latter to an extent determined by set-screws $b$ passing through lugs $d$ on the slide. A spindle, N, is so fitted to the upper portion of the carrier M that it can both turn and slide freely therein, (see Fig. 4,) and at the outer end of the spindle is a chuck consisting of a sleeve, $e$, split throughout a portion of its length, as shown in Fig. 5, and secured to the spindle by a tapering key, $h$, on driving which tight the sleeve is drawn onto the spindle, and the beveled end $i$ of the latter causes the expansion of the split portion of the sleeve, which is thus forced against the interior of the recess $n$ of the blank bowl $m$, Fig. 1, of the tobacco-pipe, as shown in Figs. 4 and 5.

A portion, $p$, of the spindle N is threaded, and this portion is adapted to a nut $q$, which can be maintained stationary against the carrier by a spring-catch, $t$, when a nice adjustment of the spindle becomes necessary, the nut being released when a rapid adjustment of the spindle is required.

A blank bowl, which may be similar to that shown in Fig. 1, is made—that is to say, the recess $n$ is formed in the blank, the upper edge of the bowl turned, and a projection, $w$, formed for the reception of the stem of the pipe. This blank is then fitted to the chuck of the spindle N, and, by the proper manipulation of the lathe while the blank is exposed to the cutter, the said blank may soon be reduced to the shape shown in Fig. 2.

It will be observed that every facility is afforded for such adjustment of the different parts of the machine that a number of blank bowls may be shaped precisely alike; for instance, after a proper adjustment of the slide I and set-screws $b\ b$, all the bowls produced by turning the spindle N on its axis and vibrating the carrier while the cutter is acting on the wood will be of the same size; but the size and shape of the bowls may be varied by readjusting the set-screws $b\ b$, altering the positions of the slides I and G, and by a longitudinal adjustment of the spindle N.

It should be remarked, however, that whenever a spherical-ended bowl is to be formed by vibrating the carrier, while the wood is against the face of the cutter, the slide I should always be in such a position that a vertical line continued from the face of the cutter downward and at right angles to the axis of the spindle N shall pass through the center of the set-screw $a$, on which the pin vibrates.

We claim as our invention—

1. The combination of the rotating cutter E, having at one side a flat cutting-face, and a carrier, M, provided with appliances for holding the bowl of a pipe, and adjustable, as described, so that the said bowl may be presented at any desired angle to the cutting-face.

2. The combination of the carrier M and its spindle N with the slides I and G and plate E.

3. The within-described chuck, consisting of the tapering end *i* of the spindle N, sleeve *e*, split throughout a portion of its length, and a key, *b*, passing through both sleeve and spindle, all as set forth.

In testimony whereof we have signed our names to this specification in the presence of two subscribing witnesses.

JOHN SCHNEIDER.
L. UILTING.

Witnesses:
WM. A. STEEL,
HARRY SMITH.